C. HEINRICH.
DUMPY LEVEL.
APPLICATION FILED JUNE 30, 1919.

1,341,209.

Patented May 25, 1920.

Inventor,
Carl Heinrich,
by Edward F. Allen.
his Attys.

UNITED STATES PATENT OFFICE.

CARL HEINRICH, OF SOMERVILLE, MASSACHUSETTS, ASSIGNOR TO BERTRAND L. MAKEPEACE, INC., A CORPORATION OF MASSACHUSETTS.

DUMPY-LEVEL.

1,341,209.      Specification of Letters Patent.      Patented May 25, 1920.

Application filed June 30, 1919. Serial No. 307,848.

*To all whom it may concern:*

Be it known that I, CARL HEINRICH, a subject of the Government of Hungary, and a resident of Somerville, in the county of Middlesex and Commonwealth of Massachusetts, have invented certain new and useful Improvements in Dumpy-Levels, of which the following is a specification.

This invention relates to surveying instruments and more particularly to the so-called dumpy level, an instrument used to great extent by gardeners, railroads and drain layers.

An object of this invention is to produce a simple and comparatively inexpensive instrument which at the same time is capable of giving and maintaining the necessary degree of accuracy required in instruments of this description.

Another object of this invention is to so construct it, that the line of collimation and the level may be first properly adjusted, and thereafter both may be adjusted simultaneously to assume a true perpendicular to the pivotal center of the instrument.

A further object of this invention is to so construct the pivotal stud and some of the parts carried thereby that a minimum amount of skill and accuracy of workmanship is required to produce an instrument fully equal to the requirements as to accurate results to be obtained as well as compactness and durability.

Heretofore levels of this class have been made wherein the telescope and level carrying bar have been made integral with the pivotal stud. Such construction involved the highest degree of mechanical skill to so properly machine and fit the parts that accuracy in a true perpendicular adjustment between the line of collimation, level, and the pivotal center of the instrument be obtained.

Other instruments have been made wherein the telescope and level carrying bar have been made separately from the pivotal stud and being provided with machined portions supposedly accurate, adapted to abut similar portions of a bar integral with the pivotal stud.

Such construction was seldom if ever found to be accurate when the instrument was assembled for use, due to the fact that it is necessary to first adjust the line of collimation and the level, and thereafter both must be adjusted to assume a true perpendicular to the pivotal center of the instrument. In the last mentioned case, it has been found that almost invariably the services of a highly skilled and expensive workman were required to obtain the second and extremely important adjustment.

Brifly the present invention comprises a telescope and level carrying bar, with the necessary adjustments for the level, a pivotal stud and a support thereon adapted to pivotally receive said bar, and adjusting devices on said support coacting with said bar to control the horizontal position of said bar.

The invention will be more fully understood by reference to the following description of the drawings and to the claims hereinafter given.

Referring to the drawings.

Figure 1:
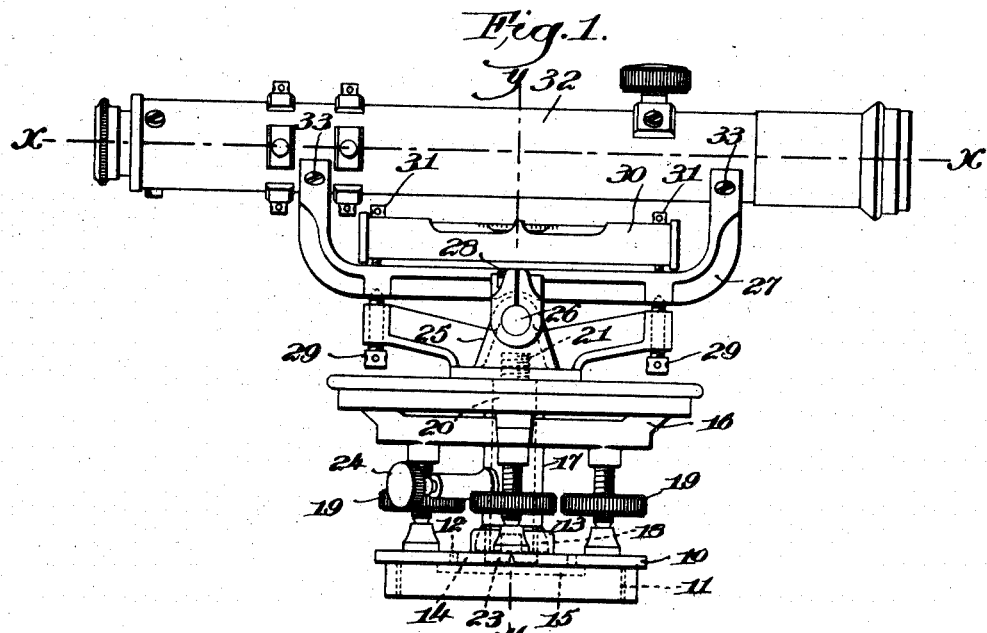
Figure 1 represent a side elevation of a dumpy level embodying the features of the present invention.
Figure 2:
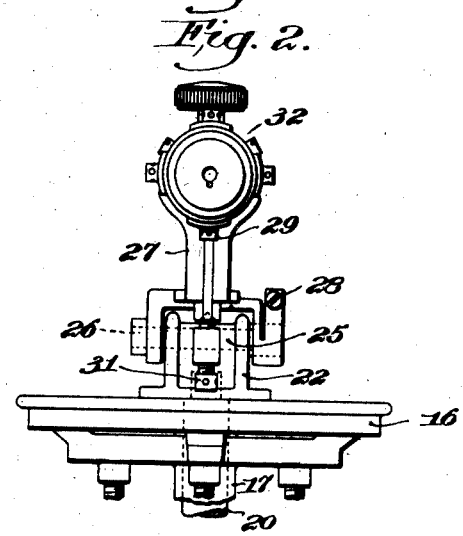
Fig. 2 represents a front or left hand elevation of Fig. 1 some of the parts being broken away.

In the drawings, 10 is a cap internally threaded at 11 adapted to be screwed to a receiving member not shown and which in practice is rigidly attached to a tripod or stand.

The cap 10 has an enlarged opening therethrough as at 12, through which the upwardly extending portion 13 of a flanged member 14 is passed, the flanged portion 15 acting as a stop against the under side of the cap 10.

A table like structure 16, having a depending hollow shank 17 is threaded at its lower end to receive a semi spherical nut 18 which is adapted to rock in the bearing member 13 all as usual in instruments of this description having a so-called shiftable center.

Interposed between the cap 10 and the table 16 are the usual leveling screws 19 which also act to secure the table 16 and the cap 10 in relative position.

The pivotal stud 20 in this instance has a reduced threaded end 21 adapted to receive the supporting member 22. At its lower end the stud 20 is internally threaded to receive the screw 23, the head of which is of such diameter as to overlap the lower end of the shank 17 whereby the stud 20 and its attached supporting member are held in relative position. The stud 20 is adapted to turn freely in the shank 17 and may be clamped in any desired position by the screw 24. The table 16 is provided with the usual graduated circle and vernier not shown.

A bearing 25 on the supporting member 22 is provided with a pintle 26, the ends of which are embraced by extensions depending from the telescope and level carrying bar 27 and held therein by the clamp screw 28.

It is an important feature of this invention that the bar 27 be made adjustable relatively to the pivotal center $y$ of the instrument and to accomplish this the support 22 is provided with adjusting screws 29 adapted to bear against the bar 27 to swing said bar in the required direction about its pintle 26 to obtain a true perpendicular adjustment of the line of collimation $x$ and level with respect to the pivotal center of the instrument.

The level 30 is adjustably mounted on the bar 27 by means of the screws 31 while the telescope 32 is rigidly secured to the said bar 27 by means of the screws 33. It will be readily seen that a perfect adjustment between the line of collimation and level may be obtained through the medium of said screws 31.

When the adjustment is obtained it is then necessary to adjust the line of collimation $x$ and level with respect to the pivotal center $y$ of the instrument. This latter adjustment will be obtained principally by means of the screws 29 even though slight manipulation of the leveling screws 19 may be necessary.

From the foregoing it will be seen that the invention is apparently a simple one and yet is of undoubted utility and enables the manufacturer to produce and sell an instrument sufficiently accurate for the needs of the user at much less expense than heretofore.

In making the bar 27 and pivotal stud 20 separately, and relatively adjustable to a nicety, a great saving of time of highly skilled labor is obtained.

Preferably to further reduce the expense of manufacture the support 22 and stud 20 are made separately but it will be understood that they may be made integral if so desired without great expense or skilled labor.

It will be understood that changes of design construction and arrangement of the parts may be made without departing from the spirit and scope of this invention.

Having thus described the invention, I claim—

1. In an instrument of the class described, a telescope; a level; a carrier to which said telescope is rigidly attached and said level adjustably attached; a pivot midway of the length of said carrier and transversely thereof about which said carrier may be swung in a vertical path; a revoluble support upon which said carrier is pivoted having a pivot stud depending therefrom about which said support is adapted to be swung in a horizontal plane; radial arms extending from said support having combined adjusting and clamp screws in the ends thereof adapted to engage said carrier whereby said carrier may be adjusted relatively to and firmly clamped with said support; and means to bodily adjust the above named elements simultaneously.

2. In an instrument of the class described, a telescope; a level, a carrier upon which said telescope and level are relatively adjustable, whereby the lines of collimation of the telescope and the level may be brought into parallelism; a support for said carrier having arms oppositely extended in the direction of length of said telescope; a pivot bearing midway of the ends of said arms at right angles thereto; ears depending from said carrier adapted to receive a pivot pin; a pivot pin adapted to coact with said pivot bearing and said ears to provide a center about which said carrier and attached telescope and level may be simultaneously rocked; a fastening means on one of said ears to clamp said pin thereto; adjusting screws at the ends of said arms adapted to rock said carrier about said pivot pin in a vertical plane; and a detachable pivot stud arranged directly beneath said pivot pin and perpendicularly thereto forming a center around which the said support may be swung in a horizontal plane.

3. In an instrument of the class described, in combination, a telescope; a carrier therefor to which said telescope is rigidly attached; a level adjustably mounted on said carrier; a rotatable support for said carrier comprising a base portion having two radial arms extending therefrom; threaded receptacles in the ends of said arms adapted to receive combined adjusting and clamping screws; a pivot bearing located midway of the length of said arms and transversely thereof; ears laterally and downwardly extending from said carrier, a pivot pin coacting with said pivot bearing and said ears to provide a center about which said carrier may be rocked; a pivot stud detachably connected to said support and arranged perpendicularly to said pivot pin; and means to adjust said telescope independently of said adjusting and clamping screws.

Signed by me at 4 Post Office Square, Boston, Mass. this 21st day of June, 1919.

CARL HEINRICH.